United States Patent [19]

White et al.

[11] 3,951,003
[45] Apr. 20, 1976

[54] CRANK MECHANISM
[75] Inventors: Neil S. White; George R. Schindler, both of Rochester, N.Y.
[73] Assignee: Eastman Kodak Company, Rochester, N.Y.
[22] Filed: Sept. 17, 1974
[21] Appl. No.: 506,824

[52] U.S. Cl. .................................. 74/44; 74/25; 74/579 R
[51] Int. Cl.² ................................. B21B 45/02
[58] Field of Search ............... 74/44, 22 R, 25, 24, 74/579 R; 308/3 R, 3 CH

[56] References Cited
UNITED STATES PATENTS
| | | | |
|---|---|---|---|
| 2,687,649 | 8/1954 | Seragnoli | 74/44 |
| 2,767,588 | 10/1956 | Drury | 74/44 |

FOREIGN PATENTS OR APPLICATIONS
| | | | |
|---|---|---|---|
| 296,450 | 2/1917 | Germany | 74/44 |

Primary Examiner—Kenneth W. Sprague
Assistant Examiner—James C. Yeung
Attorney, Agent, or Firm—S. W. Gremban

[57] ABSTRACT

A crank mechanism for imparting reciprocal lineal movement to a member through forward and reverse strokes, and providing dwell periods for the member at each end of its stroke. The crank mechanism comprises a rotatable crank shaft for rotatably driving an eccentrically mounted crank pin which imparts reciprocal movement to a member via a connecting rod. A cam is provided for altering the throw between the axes of the crank pin and crank shaft at each end of the stroke of the member to provide dwell periods for the member in such positions.

8 Claims, 3 Drawing Figures

CRANK MECHANISM

BACKGROUND OF THE INVENTION

1. Field of the Invention

This invention relates generally to apparatus for translating circular movement into reciprocal lineal movement, and more specifically to a crank mechanism for imparting reciprocal lineal movement to a member through forward and reverse strokes with dwell periods at each end of its stroke.

2. Description of the Prior Art

It is generally well known in the art to provide apparatus for imparting reciprocal lineal movement to a member with dwell periods at each end of its stroke. Exemplary apparatus can be found in the motion picture and photographic printing art for intermittently feeding a film through a film gate. Such apparatus, of which U.S. Pat. Nos. 1,825,254 and 3,044,676 are exemplary, obtain the reciprocal movement of a member and dwell periods at each end of its stroke by means of interacting cams. One disadvantage of such apparatus, particularly at high speed application, is that the cam and cam follower parts are subject to heavy wear resulting in substantial maintenance and replacement costs.

SUMMARY OF THE INVENTION

In accordance with a preferred embodiment of the invention, a crank mechanism is disclosed for imparting reciprocal lineal movement to a member through forward and reverse strokes, and providing dwell periods for the member at each end of its stroke. The crank mechanism comprises a rotatable crank shaft, and means coupled to and rotatably driven by the crank shaft and including an eccentric crank pin having an axis radially spaced a predetermined throw distance from the axis of the crank shaft. The crank pin is further drivingly connected to the member by a connecting rod for imparting reciprocal movement to the member through forward and reverse strokes. The crank mechanism is further provided with means for moving the crank pin relative to the crank shaft for altering the predetermined throw distance and providing dwell periods for the member at each end of its stroke.

More specifically, in this embodiment of the invention, the means coupled to the crank shaft comprises a bracket slidably mounted radially of the crank shaft. The crank shaft is provided with a yoke at one end, and stub shafts secured to the yoke. The bracket is slidably mounted on the stub shafts for movement radially of the crank shaft. The bracket further has a first opening for receiving the crank pin, and a second opening transverse to the first opening for slidably receiving a cross member which is secured to the crank pin. The bracket further has means for adjusting the position of the crank pin radially of the crank shaft for establishing the predetermined throw. The adjusting means comprises a screw which is preferably a differential screw for interconnecting the cross member to the bracket. Resilient means is interposed between the cross member and the bracket for preloading the screw. The crank pin moving means comprises a cam follower on the bracket engageable with a stationary cam.

It is accordingly one of the objects and advantages of the present invention to provide an improved crank mechanism for imparting reciprocal lineal movement to a member through forward and reverse strokes, and providing dwell periods for the member at each end of its stroke.

Another object and advantage of the invention is to provide a crank mechanism for imparting reciprocal lineal movement to a member that is capable of high speed, repetitive operation with minimal wear.

Another object and advantage of this invention is to provide a crank mechanism that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
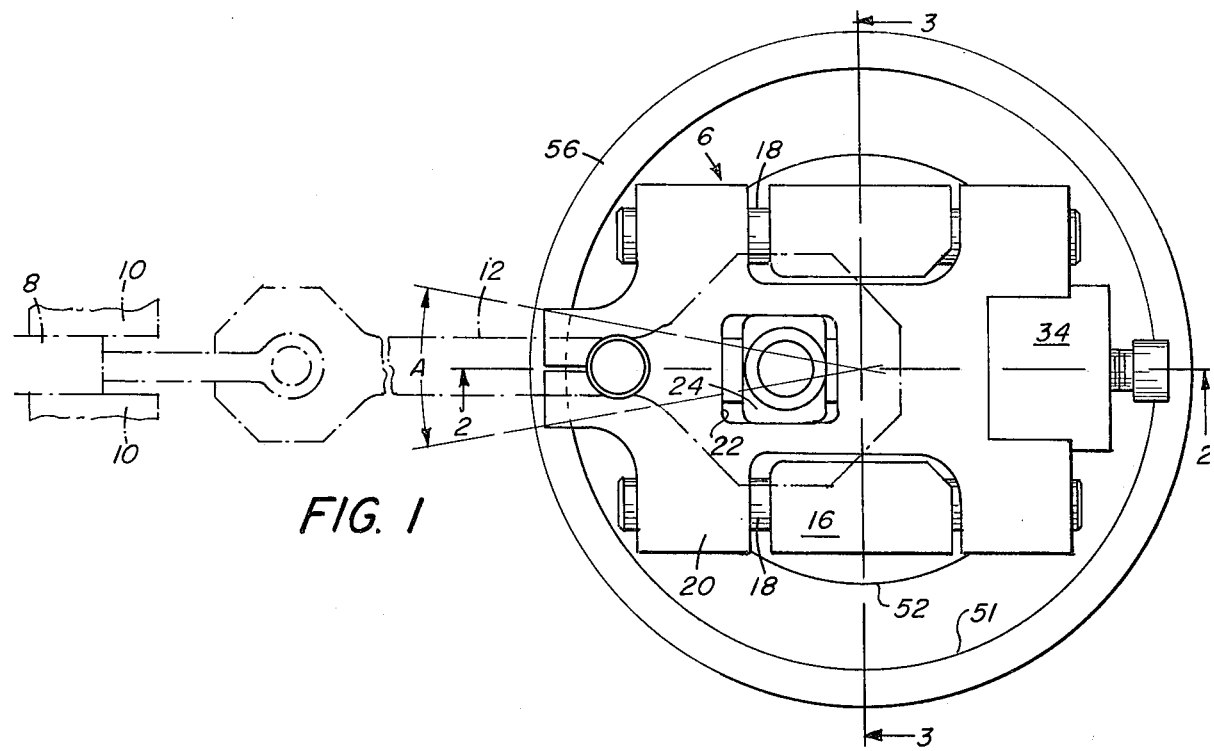
FIG. 1 is a top plan view of a preferred embodiment of the crank mechanism of this invention.

With reference to FIG. 1, a crank mechanism 6 is disclosed for imparting reciprocal movement to a member 8 such as a shuttle or the like. The shuttle 8 is constrained for lineal movement by fixed guides 10, and the shuttle is reciprocally moved through forward and reverse strokes by a connecting rod 12 interconnecting shuttle 8 to crank mechanism 6.

Figure 2:
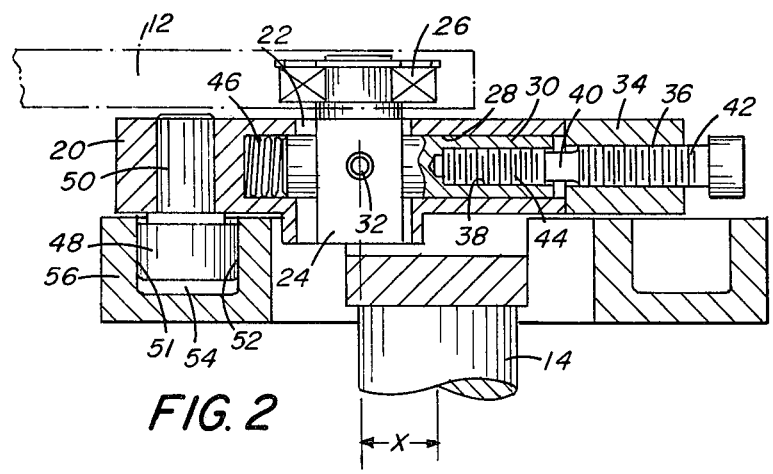
FIG. 2 is a section view taken substantially along line 2—2 of FIG. 1.
Figure 3:
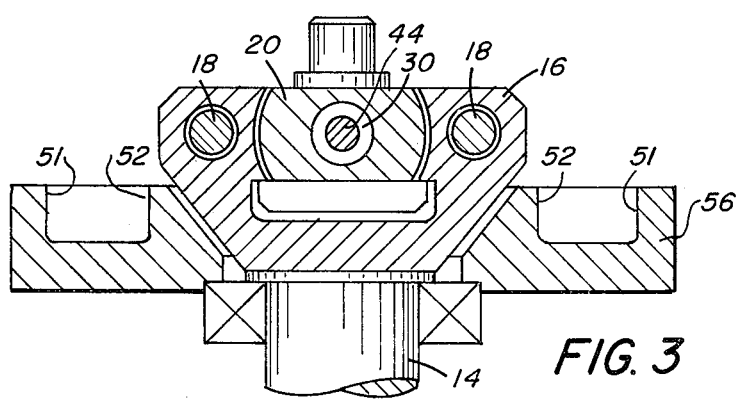
FIG. 3 is a section view taken substantially along line 3—3 of FIG. 1.

With reference to FIGS. 1–3, the crank mechanism 6 comprises a crank shaft 14 which is rotatably driven by any suitable drive mechanism, not shown. The crank shaft 14 has a yoke 16 (FIG. 3) at one end thereof provided with stub shafts 18 secured thereto. A bracket 20 is slidably mounted on stub shafts 18 for radial movement relative to the axis of crank shaft 14. The bracket 20 has an opening 22 extending therethrough for receiving a crank pin 24, one end of which is journaled in a bearing 26 mounted in one end of connecting rod 12. The bracket 20 further has another opening 28 transverse to opening 22 (FIG. 2) for slidably receiving a cylindrical rod 30. The rod extends through crank pin 24 and is secured thereto by a pin 32. A cover plate 34 is secured to bracket 20 for retaining rod 30 in opening 28, and is further provided with a threaded opening 36 in alignment with a threaded bore 38 in rod 30. A differential screw 40 having a course thread on one portion 42 threaded into opening 36 and a finer thread at the end portion 44 threaded into bore 38 provides an adjusting means for varying the distance X between the axes of crank pin 24 and crank shaft 14 to thousandths of an inch. This distance X is the crank throw for the crank mechanism 6. A spring 46 is mounted in the opening between bracket 20 and the end of rod 30 for preloading screw 40. Accordingly, rotation of crank shaft 14 imparts rotation to bracket 20 and crank pin 24 for imparting reciprocal movement to member 8.

In certain applications involving a member 8 reciprocally movable through forward and reverse strokes, it is necessary to provide dwell periods for the member at each end of its forward and reverse strokes in order to permit certain operations to occur while the member is in such positions. For example, if the member 8 were a shuttle claw mechanism for advancing a web or the like, a dwell period at each end of the forward and reverse strokes permits time to retract the claw from the web or to move the claw into engagement therewith, or to permit a clamp mechanism to clamp the web before the claw is retracted from the web and returned from the forward end position to its reverse end position. The dwell period is achieved in this crank mechanism 6 by providing a cam follower 48 rotatably mounted on one end of a spindle 50 (FIG. 2), the other end of which is secured to bracket 20. The cam follower 48 is mounted to ride between surfaces 51, 52 of a cam groove 54 in a stationary member 56. The cam surfaces 51, 52 are not cylindrical, being radially spaced a shorter distance from the crank shaft axis in those positions of crank pin 24 where member 6 is at one or the other end of its stroke. The cam follower 48 as it follows the surface of reduced radius through an angle A (FIG. 1) causes bracket 20 to slide on shafts 18 and crank pin 24 to shorten the crank throw X and to maintain a constant distance between member 8 and shaft 14 for a predetermined time interval or dwell. By varying the configuration of the cam surfaces, the dwell period or length, angle and occurrence thereof can be varied at will.

The invention has been described in detail with particular reference to a preferred embodiment, but it will be understood that variations and modifications can be effected within the spirit and scope of the invention as described.

We claim:

1. In a crank mechanism for imparting reciprocal movement to a member through forward and reverse strokes and providing dwell periods for the member at one end of at least one of its strokes, the combination comprising:

a rotatable crank shaft having an axis;
   means comprising a bracket mounted for slidable radial movement relative to the axis of said crank shaft and slidably coupled to and rotatably driven by said crank shaft, said bracket further including an eccentric crank pin having an axis radially spaced a normal predetermined throw distance from the axis of said crankshaft, said crank pin further being drivingly connected to said member for imparting reciprocal movement to said member through forward and reverse strokes; and
   means for moving said crank pin relative to said crankshaft for altering said normal predetermined throw distance to provide a dwell period for said member at one end of at least one of said forward and reverse strokes.

2. The invention according to claim 1 wherein said crank shaft has a yoke at one end and stub shafts secured to said yoke, and said bracket is slidably mounted on said stub shafts for movement radially of said crank shaft.

3. The invention according to claim 2 wherein said bracket has means for adjusting the position of said crank pin radially of said crank shaft for varying said normal predetermined throw.

4. The invention according to claim 3 wherein said bracket has a first opening for receiving said crank pin, a second opening transverse to said first opening for slidably receiving a cross member secured to said crank pin, and said adjusting means comprises a screw interconnecting said cross member to said bracket.

5. The invention according to claim 4 wherein said screw is a differential screw.

6. The invention according to claim 5, and further comprising resilient means interposed between said cross member and said bracket for preloading said screw.

7. The invention according to claim 6 wherein said crank pin moving means comprises cam means.

8. The invention according to claim 7 wherein said cam means comprises a cam follower on said bracket engageable with a stationary cam.

* * * * *